US010384407B2

(12) United States Patent
Harada et al.

(10) Patent No.: US 10,384,407 B2
(45) Date of Patent: Aug. 20, 2019

(54) SELF-REPAIRING MATERIAL AND MANUFACTURING METHOD THEREFOR

(71) Applicant: Osaka University, Suita-shi (JP)

(72) Inventors: Akira Harada, Suita (JP); Yoshinori Takashima, Suita (JP); Masaki Nakahata, Suita (JP)

(73) Assignee: Osaka University, Suita-shi (JP)

( * ) Notice: Subject to any disclaimer, the term of this patent is extended or adjusted under 35 U.S.C. 154(b) by 0 days.

(21) Appl. No.: 15/564,083

(22) PCT Filed: Apr. 8, 2016

(86) PCT No.: PCT/JP2016/061623
§ 371 (c)(1),
(2) Date: Oct. 3, 2017

(87) PCT Pub. No.: WO2016/163550
PCT Pub. Date: Oct. 13, 2016

(65) Prior Publication Data
US 2018/0133986 A1    May 17, 2018

(30) Foreign Application Priority Data
Apr. 10, 2015 (JP) ................. 2015-081082

(51) Int. Cl.
C08F 2/46        (2006.01)
C08F 2/50        (2006.01)
C08G 61/04       (2006.01)
B29C 73/18       (2006.01)
C08F 2/10        (2006.01)
C08F 4/40        (2006.01)
C08F 220/58      (2006.01)
C08F 16/02       (2006.01)
C08F 22/10       (2006.01)
C08F 22/38       (2006.01)
C08L 33/26       (2006.01)

(52) U.S. Cl.
CPC ............... B29C 73/18 (2013.01); C08F 2/10 (2013.01); C08F 2/46 (2013.01); C08F 4/40 (2013.01); C08F 16/02 (2013.01); C08F 22/105 (2013.01); C08F 22/38 (2013.01); C08F 220/58 (2013.01); C08L 33/26 (2013.01)

(58) Field of Classification Search
CPC .......... B29C 73/18; C08L 33/24; C08F 22/38; C08F 22/105; C08F 2/10; C08F 16/02; C08F 2/46; C08F 220/56; C08F 4/40; C08F 220/58
USPC .......................................... 522/184, 1; 520/1
See application file for complete search history.

(56) References Cited

U.S. PATENT DOCUMENTS

| 2013/0172479 A1* | 7/2013 | Harada | .......... C08L 33/26 524/555 |
| 2015/0073091 A1* | 3/2015 | Harada | .......... C08F 2/10 524/811 |
| 2017/0233533 A1* | 8/2017 | Harada | .......... C08G 65/337 527/312 |

FOREIGN PATENT DOCUMENTS

| JP | 2008-239722 A | 10/2008 | |
| WO | 2013/162019 A1 | 10/2013 | |
| WO | WO-2013162019 A1 * | 10/2013 | ......... C08F 2/10 |

OTHER PUBLICATIONS

Takahiro Kakuta et al. "Adhesion between Semihard Polymer Materials Containing Cyclodextrin and Adamantane Based on Host-Guest Interactions," Macromolecules, Jan. 29, 2015, vol. 48/No. 3, pp. 732-738 and Supporting Information pp. S1-S11. (cited in the ISR).
Takahiro Kakuta et al., "Highly Elastic Supramolecular Hydrogels Using Host-Guest Inclusion Complexes with Cyclodextrins," Macromolecules, vol. 46/No. 11, American Chemical Society, May 21, 2013, pp. 4575-4579 and Supporting Information pp. S1-S8. (cited in the ISR).
Takahiro Kakuta et al., "Preorganized Hydrogel: Self-Healing Properties of Supramolecular Hydrogels Formed by Polymerization of Host-Guest-Monomers that Contain Cyclodextrins and Hydrophobic Guest Groups," Advanced Materials, vol. 25, 2013, pp. 2849-2853. (cited in the ISR).
International Search Report dated Jun. 14, 2016, issued for PCT/JP2016/061623.
Masaki Nakahata et al., "Redox-Generated Mechanical Motion of a Supramolecular Polymeric Actuator Based on Host-Guest Interactions", Angewandte Chemie International Edition, vol. 52, No. 22, May 27, 2013, pp. 5731-5735. (cited in the Nov. 9, 2018 Search Report issued for EP16776716.9).
Extended European Search Report dated Nov. 9, 2018 for the corresponding EP patent application No. 16776716.9.

* cited by examiner

Primary Examiner — Jessica Whiteley
(74) Attorney, Agent, or Firm — Locke Lord LLP; James E. Armstrong, IV; Nicholas J. DiCegelie, Jr.

(57) ABSTRACT

The present invention provides a self-repairing material having self-repairing properties and shape memory properties, as well as high dynamic strength, and also provides a method for manufacturing the same. The self-repairing material of the present invention comprises a polymer comprising specific monomer units in specific ratios, and the concentration of the monomer units is within a specific range.

20 Claims, 11 Drawing Sheets (a) Example 3

(b) Example 2

(c) Example 2

Example 3

SELF-REPAIRING MATERIAL AND MANUFACTURING METHOD THEREFOR

TECHNICAL FIELD

The present invention relates to a self-repairing material comprising a polymer, and a manufacturing method therefor.

BACKGROUND ART

Self-repairing macromolecular materials have been actively researched in recent years; however, gels formed by crosslinking through general covalent bonding had a problem that if the bond was cut, bonding back to the original state was impossible, and thus self-repairing was difficult.

On the other hand, examples of self-repairing materials formed by non-covalent bonding, which is reversible bonding, include those formed by hydrogen bonding, ionic interaction, aromatic π-π interaction, bonding using metal complex formation and coordinate bonding, dynamic covalent bonding using radical formation in which binding and dissociation easily occur, or the like (PTL 1); however, all of them have insufficient bonding force. Moreover, rebinding occurs between non-cut parts. Thus, there was a problem in terms of shape memory properties.

In contrast, PTL 2 teaches that self-repairing properties and shape memory properties due to host-guest interactions are obtained from a gel comprising a host group-containing monomer, a guest group-containing monomer, and an acrylic monomer by dissolving the host group-containing monomer, the guest group-containing monomer, and the acrylic monomer in an aqueous solvent, and then copolymerizing the monomers.

CITATION LIST

Patent Literature

PTL 1: JP2008-239722A
PTL 2: WO2013/162019

SUMMARY OF INVENTION

Technical Problem

The gels disclosed in the above documents have self-repairing properties and shape memory properties; however, they may be broken if strong physical stress is applied from the outside. There was room for further improvement in the dynamic strength of these gels. An object of the present invention is to provide a self-repairing material having self-repairing properties and shape memory properties, as well as high dynamic strength, and to also provide a manufacturing method therefor.

Solution to Problem

The present inventors conducted extensive research in view of the above problems, and consequently found that a self-repairing material having self-repairing properties and shape memory properties, as well as high dynamic strength, can be obtained by incorporating a polymer comprising specific monomer units in specific ratios and concentrations, and they thereby arrived at the present invention. The present inventors conducted further research based on these findings. Thus, the present invention has been completed.

That is, the present invention relates to the following self-repairing materials and manufacturing methods therefor.

Item 1. A self-repairing material that is a gel comprising a polymer and an aqueous medium, the polymer comprising:

a monomer unit (a) derived from one or more monomers (A) represented by Formula (A):

(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, a monomer unit (b) derived from one or more monomers (B) represented by Formula (B):

(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, and a monomer unit (c) derived from one or more monomers (C) represented by Formula (C):

(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent;

wherein the polymer is represented by Formula (1-1):

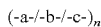
(1-1)

wherein a, b, and c represent the monomer units (a), (b), and (c), respectively, and n is a repetition number and is an integer of 2 or more; and the total concentration of the monomer units (a), (b), and (c) is 2.0 mol/kg or more and 5.0 mol/kg or less.

Item 2. A self-repairing material that is a xerogel obtained by drying a gel comprising a polymer and an aqueous medium, the polymer comprising:

a monomer unit (a) derived from one or more monomers (A) represented by Formula (A):

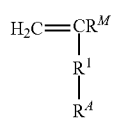
(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, a monomer unit (b) derived from one or more monomers (B) represented by Formula (B):

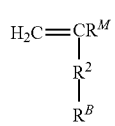
(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, and a monomer unit (c) derived from one or more monomers (C) represented by Formula (C):

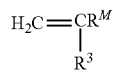
(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent;

wherein the polymer is represented by Formula (1-1):

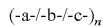
(1-1)

wherein a, b, and c represent the monomer units (a), (b), and (c), respectively, and n is a repetition number and is an integer of 2 or more; and the total concentration of the monomer units (a), (b), and (c) is 2.0 mol/kg or more and 5.0 mol/kg or less.

Item 3. The self-repairing material according to item 1 or 2, wherein the ratios of the monomer units (a) and (b) in the self-repairing material based on the total amount of the monomer units are each within a range of 1 to 10 mol %.

Item 4. The self-repairing material according to any one of claims 1 to 3, wherein the monomer (A) is one or more monomers represented by Formula (A-1):

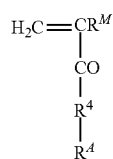
(A-1)

wherein $R^M$ is the same as the $R^M$ of Formula (A) above, $R^4$ represents oxygen or —$NR^5$—, $R^5$ represents hydrogen or alkyl optionally having one or more substituents, and $R^A$ is as defined above.

Item 5. The self-repairing material according to any one of items 1 to 4, wherein in Formula (B), $R^2$ is a divalent group formed by removing one hydrogen atom from a monovalent group selected from the group consisting of alkyl, aldehyde, carboxyl, and amide.

Item 6. The self-repairing material according to any one of items 1 to 5, wherein in Formula (B), $R^2$ and $R^B$ together form adamantyl amide optionally having one or more substituents.

Item 7. The self-repairing material according to any one of items 1 to 6, wherein the monomer (B) is acrylamide adamantane.

Item 8. The self-repairing material according to any one of items 1 to 7, wherein the monomer (A) is one or more monomers represented Formula (A-2):

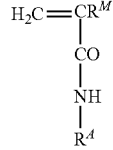
(A-2)

wherein $R^M$ is the same as the $R^M$ of Formula (A) above, and $R^A$ is as defined above.

Item 9. The self-repairing material according to any one of items 1 to 8, wherein $R^A$ is β-cyclodextrin.

Item 10. A liquid composition for manufacturing the self-repairing material according to item 1 or 2, the liquid composition comprising:

one or more monomers (A) represented by Formula (A):

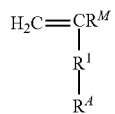
(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, one or more monomers (B) represented by Formula (B):

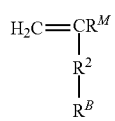
(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, one or more monomers (C) represented by Formula (C):

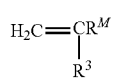
(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent, a polymerization initiator, and an aqueous solvent;

wherein the total concentration of the monomer units (a), (b), and (c) is 2.0 mol/kg or more and 5.0 mol/kg or less.

Item 11. A method for manufacturing a self-repairing material, the method comprising:

step A of mixing and dissolving one or more monomers (A), one or more monomers (B), and one or more monomers (C) in an aqueous solvent, thereby obtaining a monomer mixture solution A in which the total concentration of the monomers (A), (B), and (C) is 2.0 mol/kg or more and 5.0 mol/kg or less, wherein the one or more monomers (A) are represented by Formula (A):

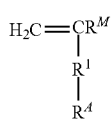
(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, the one or more monomers (B) are represented by Formula (B):

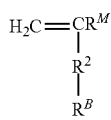
(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one substituent, aldehyde, and carboxyl, $R^B$ represents one member selected from the group consisting of alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, and the one or more monomers (C) are represented by Formula (C):

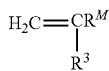

(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent; and step B of adding a polymerization initiator to the monomer mixture solution A, thereby obtaining a gel comprising a polymer represented by Formula (1-1):

$$(\text{-a-/-b-/-c-})_n \quad (1\text{-}1)$$

wherein a, b, and c represent the monomer units (a), (b), and (c), respectively, and n is a repetition number and is an integer of 2 or more.

Item 12. The manufacturing method according to item 11, further comprising step C of drying the gel obtained in step B to obtain a xerogel.

Item 13. The manufacturing method according to item 11 or 12, wherein the molar ratios of the monomers (A) and (B) based on the total amount of the monomers (A), (B), and (C) in the monomer mixture solution A are each within a range of 1 to 10 mol %.

Item 14. The manufacturing method according to any one of items 11 to 13, wherein the polymerization initiator is a photopolymerization initiator.

Item 15. The manufacturing method according to any one of items 11 to 14, wherein the polymerization initiator is ammonium persulfate (APS) or N,N,N',N'-tetramethylethylenediamine (TEMED).

Advantageous Effects of Invention

According to the present invention, a self-repairing material having self-repairing properties and shape memory properties, as well as high dynamic strength, can be obtained.

DESCRIPTION OF EMBODIMENTS

Figure 1:
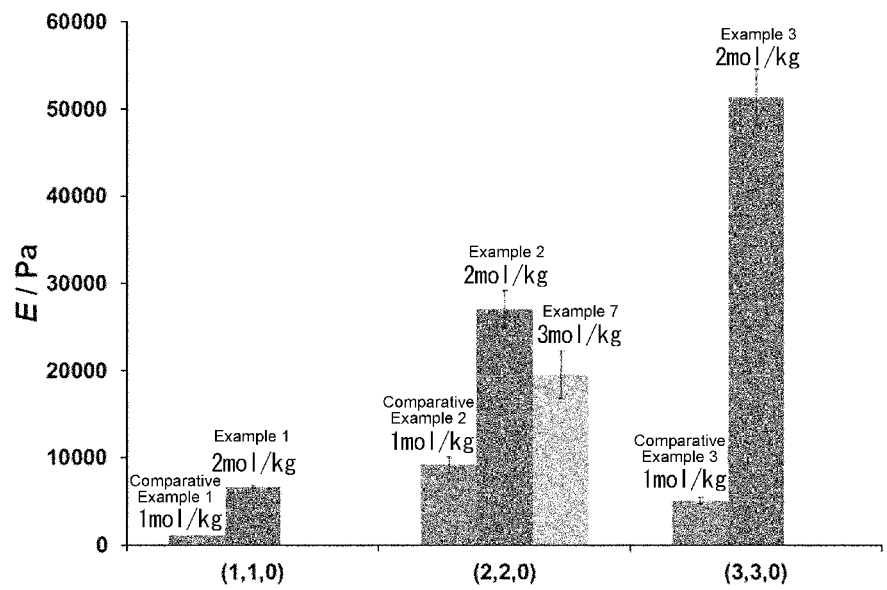
FIG. 1 shows the Young's modulus of Examples 1 to 3 and 7, and Comparative Examples 1 to 3.

The details of the present invention are described below. In the present specification, the term "(meth)acrylic" refers to "acrylic" and/or "methacrylic," and the term "(meth) acrylate" refers to "acrylate" and/or "methacrylate."

In the present specification, the "acyl" includes "acryloyl," "alkanoyl," and "aroyl," unless otherwise specifically noted.

In the present specification, the "aromatic ring group" includes "aryl" and "heteroaryl," unless otherwise specifically noted.

In the present specification, the "heterocyclic group" includes "non-aromatic heterocyclic groups" and "heteroaryl," unless otherwise specifically noted.

In the present specification, examples of the "alkyl" include linear or branched $C_1$-$C_{30}$ alkyl, such as methyl, ethyl, propyl, isopropyl, butyl, isobutyl, sec-butyl, tert-butyl, pentyl, isopentyl, neopentyl, and hexyl, unless otherwise specifically noted.

In the present specification, examples of the "alkenyl" include linear or branched $C_2$-$C_{10}$ alkenyl, such as vinyl, 1-propen-1-yl, 2-propen-1-yl, isopropenyl, 2-buten-1-yl, 4-penten-1-yl, and 5-hexen-1-yl, unless otherwise specifically noted.

In the present specification, examples of the "alkynyl" include linear or branched $C_2$-$C_{10}$ alkynyl, such as ethynyl, 1-propyn-1-yl, 2-propyn-1-yl, 4-pentyn-1-yl, and 5-hexyn-1-yl, unless otherwise specifically noted.

In the present specification, examples of the "cycloalkyl" include $C_3$-$C_{30}$ cycloalkyl, such as cyclopropyl, cyclobutyl, cyclopentyl, cyclohexyl, cycloheptyl, and adamanthyl, unless otherwise specifically noted.

In the present specification, examples of the "cycloalkenyl" include $C_3$-$C_{10}$ cycloalkenyl, such as cyclopropenyl, cyclobutenyl, cyclopentenyl, cyclohexenyl, and cycloheptenyl, unless otherwise specifically noted.

In the present specification, examples of the "cycloalkadienyl" include $C_4$-$C_{10}$ cycloalkadienyl, such as cyclobutadienyl, cyclopentadienyl, cyclohexadienyl, cycloheptadienyl, cyclooctadienyl, cyclononadienyl, and cyclodecadienyl, unless otherwise specifically noted.

In the present specification, examples of the "alkoxy" include linear or branched $C_1$-$C_{10}$ alkoxy, such as methoxy, ethoxy, propoxy, isopropoxy, butoxy, isobutoxy, sec-butoxy, pentyloxy, and hexyloxy, unless otherwise specifically noted.

In the present specification, examples of the "alkanoyl" include groups represented by the formula: R—CO—, wherein R represents alkyl, unless otherwise specifically noted.

In the present specification, the "aryl" can be monocyclic, bicyclic, tricyclic, or tetracyclic, unless otherwise specifically noted.

In the present specification, the "aryl" can be $C_6$-$C_{18}$ aryl, unless otherwise specifically noted.

In the present specification, examples of the "aryl" include phenyl, 1-naphthyl, 2-naphthyl, 2-biphenyl, 3-biphenyl, 4-biphenyl, and 2-anthryl, unless otherwise specifically noted.

In the present specification, examples of the "aralkyl" include benzyl, phenethyl, diphenylmethyl, 1-naphthylmethyl, 2-naphthylmethyl, 2,2-diphenylethyl, 3-phenylpropyl, 4-phenylbutyl, 5-phenylpentyl, 2-biphenylylmethyl, 3-biphenylylmethyl, and 4-biphenylylmethyl, unless otherwise specifically noted.

In the present specification, the "aroyl" is a group represented by the formula: R—CO—, wherein R represents aryl, unless otherwise specifically noted.

In the present specification, the "non-aromatic heterocyclic group" can be monocyclic, bicyclic, tricyclic, or tetracyclic, unless otherwise specifically noted.

In the present specification, examples of the "non-aromatic heterocyclic group" include non-aromatic heterocyclic groups containing, as ring-constituting atoms, 1 to 4 heteroatoms selected from oxygen, sulfur, or nitrogen, in addition to carbon, unless otherwise specifically noted.

In the present specification, the "non-aromatic heterocyclic group" can be saturated or unsaturated, unless otherwise specifically noted.

In the present specification, examples of the "non-aromatic heterocyclic group" include tetrahydrofuryl, oxazolidinyl, imidazolinyl (e.g., 1-imidazolinyl, 2-imidazolinyl, and 4-imidazolinyl), aziridinyl (e.g., 1-aziridinyl and 2-aziridinyl), azetidinyl (e.g., 1-azetidinyl and 2-azetidinyl), pyrrolidinyl (e.g., 1-pyrrolidinyl, 2-pyrrolidinyl, and 3-pyrrolidinyl), piperidinyl (e.g., 1-piperidinyl, 2-piperidinyl, and 3-piperidinyl), azepanyl (e.g., 1-azepanyl, 2-azepanyl, 3-azepanyl, and 4-azepanyl), azocanyl (e.g., 1-azocanyl, 2-azocanyl, 3-azocanyl, and 4-azocanyl), piperazinyl (e.g., 1,4-piperazin-1-yl and 1,4-piperazin-2-yl), diazepinyl (e.g., 1,4-diazepin-1-yl, 1,4-diazepin-2-yl, 1,4-diazepin-5-yl, and 1,4-diazepin-6-yl), diazocanyl (e.g., 1,4-diazocan-1-yl, 1,4-diazocan-2-yl, 1,4-diazocan-5-yl, 1,4-diazocan-6-yl, 1,5-diazocan-1-yl, 1,5-diazocan-2-yl, and 1,5-diazocan-3-yl), tetrahydropyranyl (e.g., tetrahydropyran-4-yl), morpholinyl (e.g., 4-morpholinyl), thiomorpholinyl (e.g., 4-thiomorpholinyl), 2-oxazolidinyl, dihydrofuryl, dihydropyranyl, dihydroquinolyl, and the like, unless otherwise specifically noted.

In the present specification, examples of the "thioalkoxy" include linear or branched $C_1$-$C_{10}$ thioalkoxy, such as methylthio, ethylthio, propylthio, isopropylthio, butylthio, isobutylthio, sec-butylthio, pentylthio, and hexylthio, unless otherwise specifically noted.

Self-Repairing Material

The self-repairing material of one embodiment of the present invention can be a self-repairing material that is a gel comprising a polymer and water, the polymer comprising:

a monomer unit (a) derived from one or more monomers (A) represented by Formula (A):

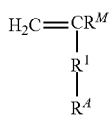

(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, a monomer unit (b) derived from one or more monomers (B) represented by Formula (B):

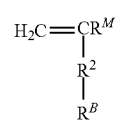

(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, and a monomer unit (c) derived from one or more monomers (C) represented by Formula (C):

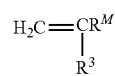

(C)

wherein $R^M$ is the same as the $R^M$ of Formula (A) above, and $R^3$ represents halogen, hydroxyl, thiol, amino optionally having one substituent, carboxyl, or amide;

wherein the polymer is represented by Formula (1-1):

(1-1)

wherein a, b, and c represent the monomer units (a), (b), and (c), respectively, and n is a repetition number and is an integer of 2 or more; and the total concentration of the monomer units is 2.0 mol/kg or more and 5.0 mol/kg or less.

Moreover, the self-repairing material of another embodiment of the present invention is a xerogel that is a dried product of a gel comprising a polymer and an aqueous medium, the polymer comprising:

a monomer unit (a) derived from one or more monomers (A) represented by Formula (A):

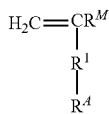

(A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin,
a monomer unit (b) derived from one or more monomers (B) represented by Formula (B):

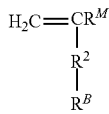

(B)

wherein $R^M$ is the same as the $R^M$ of Formula (A) above,
$R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl,
$R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents, and
a monomer unit (c) derived from one or more monomers (C) represented by Formula (C):

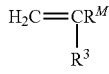

(C)

wherein $R^M$ is the same as the $R^M$ of Formula (A) above, and $R^3$ represents halogen, hydroxyl, thiol, amino optionally having one substituent, carboxyl, or amide;
wherein the polymer is represented by Formula (1-1):

(-a-/-b-/-c-)$_n$     (1-1)

wherein a, b, and c represent the monomer units (a), (b), and (c), respectively, and n is a repetition number and is an integer of 2 or more; and
the total concentration of the monomer units (a), (b), and (c) is 2.0 mol/kg or more and 5.0 mol/kg or less.

In the present specification, the "gel" refers to a state in which polymers present in a dispersion medium lose independent motility, and are aggregated and solidified; and the "xerogel" refers to a dry gel.

The monomer units (a), (b), and (c) in the polymer represented by Formula (1-1) may be randomly bonded together. The abundance ratio of each monomer unit in the polymer may be the same or different.

In the gel or xerogel of the present invention, $R^A$ and $R^B$ are considered to be non-covalently bonded to form an inclusion complex.

Preferable combinations of $R^A$ and $R^B$ that form an inclusion complex are as follows. For example, when α-cyclodextrin (cavity size: 4.7 to 5.2 Å) is used as $R^A$, examples of the group formed by $R^B$ or by $R^2$ and $R^B$ include monovalent groups formed by removing one hydrogen atom from $C_4$-$C_{18}$ alkyl compounds and alcohol derivatives thereof, carboxylic acid derivatives, amino derivatives, azobenzene derivatives having cyclic alkyl or phenyl, cinnamic acid derivatives, or the like, each of which optionally has one or more substituents. Examples of the $C_4$-$C_{18}$ alkyl include n-butyl, pentyl, hexyl, heptyl, octyl, nonyl, decyl, undecyl, dodecyl, tridecyl, tetradecyl, pentadecyl, hexadecyl, heptadecyl, octadecyl, and the like.

When β-cyclodextrin (cavity size: 6.0 to 6.5 Å) is used as $R^A$, examples of the group formed by $R^B$ or by $R^2$ and $R^B$ include monovalent groups formed by removing one hydrogen atom from t-butyl, adamantyl, aromatic compounds and alcohol derivatives thereof, carboxylic acid derivatives, amino derivatives, ferrocene derivatives, azobenzene, naphthalene derivatives, dansyl, or the like, each of which optionally has one or more substituents.

When γ-cyclodextrin (cavity size: 7.5 to 8.5 Å) is used as $R^A$, examples of the group formed by $R^B$ or by $R^2$ and $R^B$ include monovalent groups formed by removing one hydrogen atom from alkyl with up to 18 carbon atoms, alkoxy with up to 18 carbon atoms and alcohol derivatives thereof, carboxylic acid derivatives, amino derivatives, adamantyl, clusters of carbon atoms such as fullerene, aromatic dansyl, ferrocene derivatives, anthracene derivatives, or the like, each of which optionally has one or more substituents.

In the self-repairing material of the present invention, a gel or xerogel is formed through non-covalent bonding between $R^A$ and $R^B$. When the self-repairing material is cut, the portion crosslinked by non-covalent interaction between $R^A$ and $R^B$ is mainly dissociated and cut off. Therefore, when the self-repairing material is merely allowed to stand with the cut surfaces being in close contact with each other, the crosslinking is restored and the cut surfaces are adhered. Thus, the self-repairing material of the present invention has self-repairing properties.

Moreover, in the self-repairing material of the present invention, no adhesion occurs when the cut surface is brought into contact with a non-cut surface. Further, no adhesion occurs when competitor molecules are applied to the cut surface. Thus, the self-repairing material of the present invention has repairing surface selectivity in self-repairing.

Furthermore, because the non-covalent interaction between $R^A$ and $R^B$ in the self-repairing material of the present invention allows for easy re-inclusion, the gel after readhesion tends to return to the initial gel strength. The longer the adhesion time, the higher the strength recovery rate.

Moreover, the self-repairing material of the present invention is self-supporting and highly stretchable because a gel or xerogel is formed through non-covalent bonding between $R^A$ and $R^B$. Further, the self-repairing material of the present invention has shape memory properties that allow the material after stretching to quickly return to the original shape.

Furthermore, because the total concentration of the monomers constituting the polymer contained in the gel, which is the self-repairing material of the present invention, is within the specific concentration range, a self-repairing material that is the gel or a xerogel obtained by drying the gel shows very high dynamic strength.

The self-repairing material of the present invention preferably contains 1 to 10 mol % of the monomer unit (a) and 1 to 10 mol % of the monomer unit (b), more preferably 1 to 5 mol % of the monomer unit (a) and 1 to 5 mol % of the monomer unit (b), even more preferably 3 to 4 mol % of the monomer unit (a) and 3 to 4 mol % of the monomer unit (b), and particularly preferably 3 mol % of the monomer unit (a) and 3 mol % of the monomer unit (b).

The self-repairing material of the present invention may further contain a chemical crosslinking agent. The chemical crosslinking agent is not particularly limited, and N,N'-methylenebisacrylamide (MBAAm), divinylbenzene (DVB), or the like can be suitably used.

n, which represents the repetition number in Formula (1-1), is not particularly limited, as long as it is an integer of 2 or more. n is preferably 10 or more and 100000 or less, more preferably 50 or more and 50000 or less, and particularly preferably 100 or more and 10000 or less.

Moreover, $R^1$, $R^2$, $R^3$, $R^A$, and $R^B$ in the monomer units (a), (b), and (c), which constitute the polymer represented by Formula (1-1), may be the same or different, depending on their expression.

The ratio of the chemical crosslinking agent in the self-repairing material of the present invention varies depending on the type and ratio of the monomers (A), (B), and (C) contained in the self-repairing material, and can be suitably selected within a range of 5 mol % or less.

Moreover, the total concentration of the monomers constituting the polymer contained in the gel, which is the self-repairing material of the present invention, is preferably 2 to 5 mol/kg, more preferably 2 to 3 mol/kg, and particularly preferably 2.0 mol/kg. Self-repairing materials in which the total concentration of the monomers is within the above range particularly show high dynamic strength.

Furthermore, although it varies depending on the type of monomer, a highly transparent gel can be obtained by adjusting the total concentration of the monomers within the above range.

The self-repairing material of the present invention may contain compounds, monomers, monomer units, etc., other than the above monomers, monomer units, and chemical crosslinking agent, within a range that does not impair the effects of the present invention.

Monomer (A)

The monomer (A) in the present invention is one or more monomers represented by Formula (A):

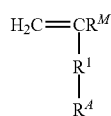

(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin. The monomers (A) may be used singly or in combination of two or more.

Examples of $R^A$ include artificial host molecules, such as derivatives of cyclodextrin (CD), calixarene, crown ether, cyclophane, and cucurbituril. Specific examples include α-cyclodextrin (α-CD), β-cyclodextrin (β-CD), γ-cyclodextrin (γ-CD), calix[6]arene sulfonic acid, calix[8]arene sulfonic acid, 12-crown-4,18-crown-6, [6]paracyclophane, [2,2]paracyclophane, cucurbit[6]uril, cucurbit[8]uril, and the like. Among these, α-CD, μ-CD, or γ-CD is preferable; and μ-CD is particularly preferable.

More specifically, the monomer (A) is preferably one or more monomers represented by Formula (A-1):

(A-1)

wherein $R^M$ is the same as the $R^M$ of Formula (A) above, $R^4$ represents oxygen or —$NR^5$—,
$R^5$ represents hydrogen or alkyl optionally having one or more substituents, and
$R^A$ is as defined above.

Particularly preferable among these is one or more monomers represented by Formula (A-2):

(A-2)

wherein $R^M$ is the same as the $R^M$ of Formula (A) above, and $R^A$ is as defined above.

The monomer (A) represented by Formula (A-2) above can be produced by reacting acrylic acid chloride with 6-amino cyclodextrin. In general, the monomer (A) can be produced by mixing and stirring acrylic acid chloride and 6-amino cyclodextrin in a solvent.

The above reaction can be carried out without a solvent or using a solvent (an organic solvent or an aqueous solvent) generally used in organic synthesis reactions. Examples of organic solvents include dimethylsulfoxide (DMSO), dimethylformamide (DMF), and the like. Moreover, examples of aqueous solvents include water and buffers optionally containing salts, such as sodium phosphate, sodium carbonate, or sodium hydrogen carbonate. When a solvent is used, the amount of the solvent may be suitably adjusted. In addition to above production method, the monomer (A) represented by Formula (A-2) above can also be produced by a method in which 1,1'-carbonyldiimidazole (CDI) or 1-ethyl-3-(3-dimethylaminopropyl)carbodiimide hydrochloride (EDC) is added to (meth)acrylic acid under ice cooling, and amino cyclodextrin is then added, followed by stirring overnight to thereby form an amide bond; or a method in which dicyclohexylcarbodiimide (DCC) and 1-hydroxybenzotriazole (HOBt) or N-hydroxysuccinimide (HOSu) are used as a condensing agent for acrylic acid, and an amide compound is obtained through an active ester.

$R^1$, $R^4$, $R^5$, and $R^A$ may be the same or different, depending on their expression.

Monomer (B)

The monomer (B) in the present invention is one or more monomers represented by Formula (B):

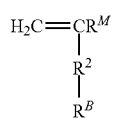

(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents.

The monomers (B) may be used singly or in combination of two or more.

$R^2$ in Formula (B) is preferably a divalent group formed by removing one hydrogen atom from a monovalent group selected from the group consisting of alkyl, aldehyde, carboxyl, and amide; more preferably a divalent group formed by removing one hydrogen atom from a monovalent group selected from the group consisting of carboxyl and amide; and particularly preferably a divalent group formed by removing one hydrogen atom from amide.

Examples of $R^B$ in Formula (B) include monocyclic or polycyclic aryl optionally having one or more substituents. Specific examples include phenyl, toluyl, xylyl, naphthyl, anthryl, phenanthryl, and the like, each of which optionally has one or more substituents. Moreover, $R^B$ in Formula (B) may be alkyl having ferrocene, which is an organometallic complex, as a substituent. It is more preferable that $R^2$ and $R^B$ in Formula (B) together form adamantyl amide or adamantyl ester, each of which optionally has one or more substituents. The monomer (B) is particularly preferably (meth)acrylamide adamantane.

When $R^2$ in Formula (B) is a divalent group formed by removing one hydrogen atom from carboxyl, the monomer (B) can be produced by reacting acrylic acid chloride with the metal alkoxide of $R^B$. In general, the monomer (B) can be produced by mixing and stirring acrylic acid chloride and the metal alkoxide of $R^B$ in a solvent.

When $R^2$ in Formula (B) is a divalent group formed by removing one hydrogen atom from amide, the monomer (B) can be produced by reacting acrylic acid chloride with the amine compound of $R^B$. In general, the monomer (B) can be produced by mixing and stirring acrylic acid chloride and the amine compound of $R^B$ in a solvent.

The same solvent as the solvent used in the production of the monomer (A) can be used in the above reaction. When a solvent is used, the amount of the solvent may be suitably adjusted.

In addition, the monomer (B) can also be produced by a method in which 1,1'-carbonyldiimidazole (CDI) or 1-ethyl-3-(3-dimethylaminopropyl)carbodiimide hydrochloride (EDC) is added to acrylic acid under ice cooling, and the amine compound of $R^B$ is then added, followed by stirring overnight to thereby form an amide bond; or a method in which dicyclohexylcarbodiimide (DCC) and 1-hydroxybenzotriazole (HOBt) or N-hydroxysuccinimide (HOSu) are used as a condensing agent for acrylic acid, and an amide compound is obtained through an active ester.

$R^2$ and $R^B$ may be the same or different, depending on their expression.

Monomer (C)

The monomer (C) in the present invention is one or more monomers represented by Formula (C):

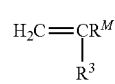

(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent.

The monomers (C) may be used singly or in combination of two or more.

The monomer (C) is not particularly limited, as long as it is a water-soluble vinyl monomer. $R^3$ in Formula (C) is preferably halogen, amino optionally having one substituent, carboxyl optionally having one substituent, or amide optionally having one substituent; more preferably carboxyl or amide; and particularly preferably amide.

$R^3$ may be the same or different, depending on its expression.

Method for Manufacturing Self-Repairing Material

The self-repairing material of the present invention can be manufactured, for example, by the method described below. Specifically, the self-repairing material of the present invention can be manufactured by a method comprising:

step A of mixing one or more monomers (A), one or more monomers (B), and one or more monomers (C) in an aqueous solvent, and heating and stirring the mixture in a hermetic container to dissolve the monomers, thereby obtaining a monomer mixture solution A in which the total concentration of the monomers (A), (B), and (C) is 2.0 mol/kg or more and 5.0 mol/kg or less, wherein the one or more monomers (A) are represented by Formula (A):

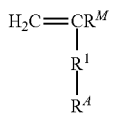
(A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin,
the one or more monomers (B) are represented by Formula (B):

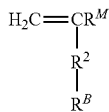
(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, aldehyde, carboxyl, and amide,
$R^B$ represents one member selected from the group consisting of alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents, and
the one or more monomers (C) are represented by Formula (C):

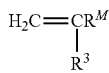
(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent; and
step B of adding a polymerization initiator to the monomer mixture solution A, thereby obtaining a gel comprising a polymer represented by Formula (1-1):

$$(-a-/-b-/-c-)_n \quad (1\text{-}1)$$

wherein a, b, and c represent the monomer units (a), (b), and (c), respectively, and n is a repetition number and is an integer of 2 or more.

Each step is described below.
Step A
In step A, one or more monomers (A) represented by Formula (A):

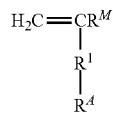
(A)

wherein $R^M$, $R^1$, and $R^4$ are as defined above,
one or more monomers (B) represented by Formula (B):

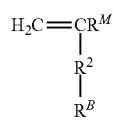
(B)

wherein $R^M$, $R^2$, and $R^B$ are as defined above, and
one or more monomers (C) represented by Formula (C):

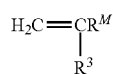
(C)

wherein $R^M$ and $R^3$ are as defined above,
are mixed and dissolved in an aqueous solvent, thereby obtaining a monomer mixture solution A in which the total concentration of the monomers (A), (B), and (C) is 2.0 mol/kg or more and 5.0 mol/kg or less.

The aqueous solvent used in step A is, for example, water or a mixed solvent of water and an organic solvent compatible with water. Water is preferable.

Examples of organic solvents compatible with water include N,N-dimethylformamide (DMF), tetrahydrofuran (THF), dimethylsulfoxide (DMSO), and the like. These organic solvents may be used singly or in combination of two or more. The mixing ratio (volume ratio) of water to the organic solvent in the mixed solvent is preferably in the range of 9:1 to 5:5, and particularly preferably 9:1 to 8:2.

The dissolution of the monomers in the solvent is not particularly limited, and can be performed, for example, in the following manner. Specifically, the monomers (A) and (B) are added to the solvent and mixed, and heated and stirred in a hermetic container to dissolve the monomers (A) and (B). The obtained solution is allowed to cool, and the monomer (C) is added thereto and dissolved. Thus, the dissolution of the monomers can be performed. The monomers (A), (B), and (C) may be used singly or in combination of two or more.

The stirring means is not particularly limited. Examples of the stirring means include methods using a magnetic stirrer and a stirrer tip, methods using a shaker, methods using a stirrer, and the like. The stirring temperature and time vary depending on the types and concentrations of the monomers (A), (B), and (C) used. Stirring can be performed at room temperature (20 to 25° C.) for 1 hour to 3 days, and preferably at 25° C. for 1 hour.

The heating means is also not particularly limited. Examples of the heating means include methods using a hot stirrer, methods using a thermostat bath, and the like. The heating temperature and time vary depending on the types and concentrations of the monomers (A), (B), and (C) used. Heating can be performed at 40 to 90° C. for 1 hour to 2 days, and preferably at 70 to 90° C. for 1 to 3 hours.

The dissolution of the monomers in the solvent can be performed by heating after completion of the stirring, or by heating with continuous stirring after stirring for a specific period of time.

As the proportion of the monomers dissolved in the solvent (based on 100 mol % of all the monomers), for example, it is preferable to contain 1 to 10 mol % of the monomer (A) and 1 to 10 mol % of the monomer (B), it is more preferable to contain 1 to 5 mol % of the monomer (A) and 1 to 5 mol % of the monomer (B), it is even more preferable to contain 3 to 4 mol % of the monomer (A) and 3 to 4 mol % of the monomer (B), and it is particularly preferable to contain 3 mol % of the monomer (A) and 3 mol % of the monomer (B).

The monomer mixture solution A may further contain compounds, monomers, etc., other than the above monomers, within a range that does not impair the effects of the present invention.

Step B

In step B, the monomers in the monomer mixture solution A are polymerized to thereby obtain a gel comprising a polymer represented by Formula (1-1):

(-a-/-b-/-c-)$_n$ (1-1)

wherein a, b, and c represent the monomer units (a), (b), and (c), respectively.

The polymerization reaction in step B is carried out by adding a polymerization promoter and optionally a polymerization initiator to the monomer mixture solution A.

Examples of polymerization initiators include ammonium persulfate (hereinafter sometimes referred to as "APS"), azobisisobutyronitrile (hereinafter sometimes referred to as "AIBN"), 1,1'-azobis(cyclohexanecarbonitrile), di-tert-butyl peroxide, tert-butyl hydroperoxide, benzoyl peroxide, photoinitiators (Irgacure (registered trademark) series, etc.), and the like. APS and AIBN are preferable.

The concentration of the polymerization initiator is preferably 0.5 to 5 mol % based on the total amount of the monomers.

In step B, a chemical crosslinking agent may be further added. Usable chemical crosslinking agents are those mentioned above.

The concentration of the chemical crosslinking agent varies depending on the type and proportion of the monomers (A), (B), and (C), and can be suitably selected within a range of 5 mol % or less.

Examples of polymerization promoters include [2-(dimethylamino)ethyl]dimethylamine (hereinafter sometimes referred to as "TEMED") and the like. TEMED is preferable.

The polymerization reaction can be carried out at 0 to 100° C., and preferably 20 to 25° C. The time of polymerization reaction is 1 to 24 hours, and preferably 12 to 24 hours.

When a photopolymerization initiator is used as the polymerization initiator, the polymerization reaction can be carried out, for example, by irradiation with UV light at a wavelength of 200 to 400 nm on a liquid composition obtained by adding the polymerization initiator and optionally a polymerization promoter to the monomer mixture solution A.

The total concentration of the monomer units (a), (b), and (c) in the gel obtained by the manufacturing method comprising steps A and B is preferably 2.0 mol/kg or more and 5.0 mol/kg or less, more preferably 2.0 to 3.0 mol/kg, and particularly preferably 2.0 mol/kg.

The manufacturing method of the present invention may further comprise step C of drying the gel obtained in steps A and B, thereby obtaining a xerogel.

The method of drying the gel is not particularly limited. For example, drying can be performed by allowing the gel to stand at room temperature (20 to 25° C.) for 8 hours to 3 days, and preferably at 25° C. for 3 days.

Making use of its excellent toughness, self-repairing properties, and shape memory properties, the self-repairing material of the present invention can be used for applications, such as paint resins, coating films, shock absorbers, plastic containers, and vascular embolization materials for medical use (e.g., hydrogel beads).

In the method for manufacturing the self-repairing material of the present invention, gelation or xerogelation can be performed according to various applications mentioned above. For example, when a film-like self-repairing material is manufactured, a liquid composition obtained by adding a polymerization initiator and optionally a polymerization promoter to the monomer mixture solution A is sandwiched between glass plates, etc.; or the liquid composition is sprayed with an airbrush or the like, and then formed into a gel or xerogel.

EXAMPLES

The present invention is described in more detail below with reference to Examples. However, the present invention is not limited to these Examples.

Measuring Instrument

In the Examples and Comparative Examples, various physical properties were measured as follows.

Stretchability

Compression Test

Measuring instrument: RE-33005B, produced by Yamaden Co., Ltd.

Measurement conditions: A cylindrical plunger (diameter: 5 mm) made of Teflon (registered trademark) was pressed from above to a horizontally placed sample, and stress to the applied strain was measured. The elastic modulus of the sample was calculated from a value obtained by extrapolating the initial gradient of the obtained stress-strain curve to a strain of 100%.

Tension Test

Measuring instrument: AUTOGRAPH AG-X plus, produced by Shimadzu

Measurement conditions: A sample molded in an appropriate size was fixed with measurement clips from upper and lower sides and vertically stretched, and stress to the applied strain was measured. The mechanical characteristics of the sample were evaluated from the obtained stress-strain curve.

Self-Repairing Properties

Film Thickness Measurement

Measuring instrument: VK-X150, produced by Keyence

Measurement conditions: A sample molded in a film shape was horizontally placed and observed from above with a laser microscope. The heights corresponding to the upper surface and lower surface of the film were measured. The film thickness was calculated from the height difference.

$^1$H NMR Measurement (Composition Ratio Calculation)

Measuring instrument: ECA-500, produced by JEOL

Measurement temperature: 30° C.

Solvent: DMSO-d$^6$
Gel

Example 1

In a sample bottle (3 mL), water was added to 6-acrylamide-β-cyclodextrin (βCD-AAm) as a monomer (A) and 1-acrylamide adamantane (Ad-AAm) as a monomer (B), and mixed. The bottle was sealed, and the mixture was heated and stirred at 90° C. for 3 hours. The obtained solution was allowed to cool to room temperature, and acrylamide (AAm) (produced by Wako Pure Chemical Industries, Ltd.) as a monomer (C) was added thereto and dissolved. The concentrations of βCD-AAm, Ad-AAm, and AAm in the obtained solution, and the total concentration of these monomers, were set to 20 mmol/kg, 20 mmol/kg, 1.96 mol/kg, and 2 mol/kg, respectively. Thereafter, 20 mmol/kg of ammonium persulfate (APS) and 20 mmol/kg of [2-(dimethylamino)ethyl]dimethylamine (TEMED) were added in this order, and the mixture was allowed to stand at room temperature for 1 hour to allow polymerization to occur, followed by washing, thereby obtaining a gel (HG1) in which the molar ratio of βCD-AAm-derived units and the molar ratio of Ad-AAm-derived units were both 1 mol % based on the total amount of the monomers.

Example 2

A gel (HG2) was obtained in the same manner as in Example 1, except that the molar ratio of ρCD-AAm-derived units and the molar ratio of Ad-AAm-derived units were both 2 mol % based on the total amount of the monomers.

Example 3

A gel (HG3) was obtained in the same manner as in Example 1, except that the molar ratio of βCD-AAm-derived units and the molar ratio of Ad-AAm-derived units were both 3 mol % based on the total amount of the monomers.

Example 4

A gel (HG4) was obtained in the same manner as in Example 1, except that the molar ratio of βCD-AAm-derived units and the molar ratio of Ad-AAm-derived units were both 4 mol % based on the total amount of the monomers.

Example 5

A gel (HG5) was obtained in the same manner as in Example 1, except that the molar ratio of βCD-AAm-derived units and the molar ratio of Ad-AAm-derived units were both 5 mol % based on the total amount of the monomers.

Example 6

A gel (HG6) was obtained in the same manner as in Example 2, except that the total concentration of the monomers was changed to 2.5 mol/kg.

Example 7

A gel (HG7) was obtained in the same manner as in Example 2, except that the total concentration of the monomers was changed to 3.0 mol/kg.

Example 8

A gel (HG8) was obtained in the same manner as in Example 2, except that Adamantate M-104 (registered trademark, produced by Osaka Organic Chemical Industry Ltd.) was used as the monomer (B), in place of 1-acrylamide adamantane (Ad-AAm).

Example 9

A gel (HG9) was obtained in the same manner as in Example 2, except that Adamantate M-105 (registered trademark, produced by Osaka Organic Chemical Industry Ltd.) was used as the monomer (B), in place of 1-acrylamide adamantane (Ad-AAm).

Example 10

A gel (HG10) was obtained in the same manner as in Example 2, except that Adamantate M-109 (registered trademark, produced by Osaka Organic Chemical Industry Ltd.) was used as the monomer (B), in place of 1-acrylamide adamantane (Ad-AAm).

Example 11

A gel (HG11) was obtained in the same manner as in Example 2, except that Adamantate HM (registered trademark, produced by Osaka Organic Chemical Industry Ltd.) was used as the monomer (B), in place of 1-acrylamide adamantane (Ad-AAm).

Example 12

A gel (HG12) was obtained in the same manner as in Example 2, except that MADMA (registered trademark, produced by Osaka Organic Chemical Industry Ltd.) was used as the monomer (B), in place of 1-acrylamide adamantane (Ad-AAm).

Example 13

A gel (HG13) was obtained in the same manner as in Example 2, except that EAMA (P) (registered trademark, produced by Osaka Organic Chemical Industry Ltd.) was used as the monomer (B), in place of 1-acrylamide adamantane (Ad-AAm).

Example 14

A gel (HG14) was obtained in the same manner as in Example 2, except that N,N-dimethylacrylamide (DMA) (produced by Sigma Aldrich) was used as the monomer (C), in place of acrylamide (AAm) (produced by Wako Pure Chemical Industries, Ltd.).

Example 15

A gel (HG15) was obtained in the same manner as in Example 2, except that N-isopropylacrylamide (NIPAAm) (produced by Wako Pure Chemical Industries, Ltd.) was used as the monomer (C), in place of acrylamide (AAm) (produced by Wako Pure Chemical Industries, Ltd.).

Example 16

A gel (HG16) was obtained in the same manner as in Example 2, except that hydroxyethyl acrylate (HEA) (produced by Tokyo Chemical Industry Co., Ltd.) was used as the monomer (C), in place of acrylamide (AAm) (produced by Wako Pure Chemical Industries, Ltd.).

Example 17

A gel (HG17) was obtained in the same manner as in Example 2, except that hydroxyethyl methacrylate (HEMA) (produced by Tokyo Chemical Industry Co., Ltd.) was used as the monomer (C), in place of acrylamide (AAm) (produced by Wako Pure Chemical Industries, Ltd.).

Example 18

A gel (HG18) was obtained in the same manner as in Example 2, except that hydroxymethyl acrylamide (HMAAm) (produced by Wako Pure Chemical Industries, Ltd.) was used as the monomer (C), in place of acrylamide (AAm) (produced by Wako Pure Chemical Industries, Ltd.).

Example 19

In a sample bottle (3 mL), water was added to 6-acrylamide-β-cyclodextrin (βCD-AAm) as a monomer (A) and 1-acrylamide adamantane (Ad-AAm) as a monomer (B), and mixed. The bottle was sealed, and the mixture was heated and stirred at 90° C. for 3 hours. The obtained solution was allowed to cool to room temperature, and acrylamide (AAm) (produced by Wako Pure Chemical Industries, Ltd.) as a monomer (C) and N,N'-methylenebisacrylamide (MBAAm)(produced by Nacalai Tesque Co., Ltd.) as a chemical crosslinking agent were added thereto and dissolved. The concentrations of βCD-AAm, Ad-AAm, AAm, and MBAAm in the obtained solution, and the total concentration of these monomers, were set to 20 mmol/kg, 20 mmol/kg, 10 mmol/kg, 1.94 mol/kg, and 2 mol/kg, respectively. Thereafter, 20 mmol/kg of ammonium persulfate (APS) and 20 mmol/kg of [2-(dimethylamino)ethyl] dimethylamine (TEMED) were added in this order, and the mixture was allowed to stand at room temperature for 1 hour to allow polymerization to occur, followed by washing, thereby obtaining a gel (HG19) in which the molar ratio of βCD-AAm-derived units, the molar ratio of Ad-AAm-derived units, and the molar ratio of MBAAm-derived units were 2 mol %, 2 mol %, 2 mol %, and 1 mol %, respectively, based on the total amount of the monomers.

Xerogel

Example 20

A gel obtained in the same manner as in Example 2 was dried to obtain a xerogel (XG1).

Example 21

A gel obtained in the same manner as in Example 14 was dried to obtain a xerogel (XG2).

Example 22

A gel obtained in the same manner as in Example 15 was dried to obtain a xerogel (XG3).

Example 23

A gel obtained in the same manner as in Example 16 was dried to obtain a xerogel (XG4).

Example 24

A gel obtained in the same manner as in Example 17 was dried to obtain a xerogel (XG5).

Example 25

A gel obtained in the same manner as in Example 18 was dried to obtain a xerogel (XG6).

Example 26 (Film-Like Gel Obtained by Sandwich Method)

In a sample bottle (3 mL), water was added to 6-acrylamide-β-cyclodextrin (βCD-AAm) as a monomer (A) and 1-acrylamide adamantane (Ad-AAm) as a monomer (B), and mixed. The bottle was sealed, and the mixture was heated and stirred at 90° C. for 3 hours. The obtained solution was allowed to cool to room temperature, and acrylamide (AAm) (produced by Wako Pure Chemical Industries, Ltd.) as a monomer (C) was added thereto and dissolved. The concentrations of βCD-AAm, Ad-AAm, and AAm in the obtained solution, and the total concentration of these monomers were set to 20 mmol/kg, 20 mmol/kg, 1.96 mol/kg, and 2 mol/kg, respectively. A solution obtained by adding a photopolymerization initiator (Irgacure (registered trademark)) to the above solution was sandwiched between Teflon (registered trademark) and glass, followed by irradiation with UV light, thereby obtaining a film-like gel.

Example 27 (Film-Like Gel Obtained by Sandwich Method)

In a sample bottle (3 mL), water was added to 6-acrylamide-β-cyclodextrin (βCD-AAm) as a monomer (A) and 1-acrylamide adamantane (Ad-AAm) as a monomer (B), and mixed. The bottle was sealed, and the mixture was heated and stirred at 90° C. for 3 hours. The obtained solution was allowed to cool to room temperature, and acrylamide (AAm) (produced by Wako Pure Chemical Industries, Ltd.) as a monomer (C) was added thereto and dissolved. The concentrations of βCD-AAm, Ad-AAm, and AAm in the obtained solution, and the total concentration of these monomers, were set to 20 mmol/kg, 20 mmol/kg, 1.96 mol/kg, and 2 mol/kg, respectively. A solution obtained by adding a photopolymerization initiator (Irgacure (registered trademark)) to the above solution was sandwiched between two sheets of glass, followed by irradiation with UV light, thereby obtaining a film-like gel.

Example 28 (Film-Like Gel Obtained by Airbrush Method)

In a sample bottle (3 mL), water was added to 6-acrylamide-β-cyclodextrin (βCD-AAm) as a monomer (A) and 1-acrylamide adamantane (Ad-AAm) as a monomer (B), and mixed. The bottle was sealed, and the mixture was heated and stirred at 90° C. for 3 hours. The obtained solution was allowed to cool to room temperature, and acrylamide (AAm) (produced by Wako Pure Chemical Industries, Ltd.) as a monomer (C) was added thereto and dissolved. The concentrations of βCD-AAm, Ad-AAm, and AAm in the obtained solution, and the total concentration of these monomers, were set to 20 mmol/kg, 20 mmol/kg, 1.96 mol/kg, and 2 mol/kg, respectively. A solution obtained by adding a photopolymerization initiator (Irgacure (registered trademark)) to the above solution was applied to the surface of glass using an airbrush, followed by irradiation with UV light, thereby obtaining a film-like gel.

Comparative Example 1

A gel (HG20) was obtained in the same manner as in Example 1, except that the total concentration of the monomers was changed to 1 mol/kg.

Comparative Example 2

A gel (HG21) was obtained in the same manner as in Example 2, except that the total concentration of the monomers was changed to 1 mol/kg.

Comparative Example 3

A gel (HG22) was obtained in the same manner as in Example 3, except that the total concentration of the monomers was changed to 1 mol/kg.

Comparative Example 4

A gel (HG23) was obtained in the same manner as in Example 2, except that the total concentration of the monomers was changed to 1.5 mol/kg.

Comparative Example 5

Earthquake-resistant polyurethane rubber (imported and sold by Kohnan Shoji Co., Ltd.)

Comparative Example 6

In a sample bottle (3 mL), hydroxyethyl acrylate (HEA) (produced by Tokyo Chemical Industry Co., Ltd.) as a monomer (C) and N,N-methylenebisacrylamide (MBAAm) (produced by Nacalai Tesque Co., Ltd.) as a chemical crosslinking agent were placed and dissolved. The concentrations of HEA and MBAAm in the obtained solution, and the total concentration of these monomers, were set to 1.98 mol/kg, 20 mmol/kg, and 2 mol/kg, respectively. Thereafter, 20 mmol/kg of ammonium persulfate (APS) and 20 mmol/kg of [2-(dimethylamino)ethyl]dimethylamine (TEMED) were added in this order, and the mixture was allowed to stand at room temperature for 1 hour to allow polymerization to occur, followed by washing, thereby obtaining a gel. The gel was dried to obtain a xerogel (XG7).

Test Example 1 (Evaluation of Stretchability)

Test Example 1-1 (Compression Test)

Figure 2:
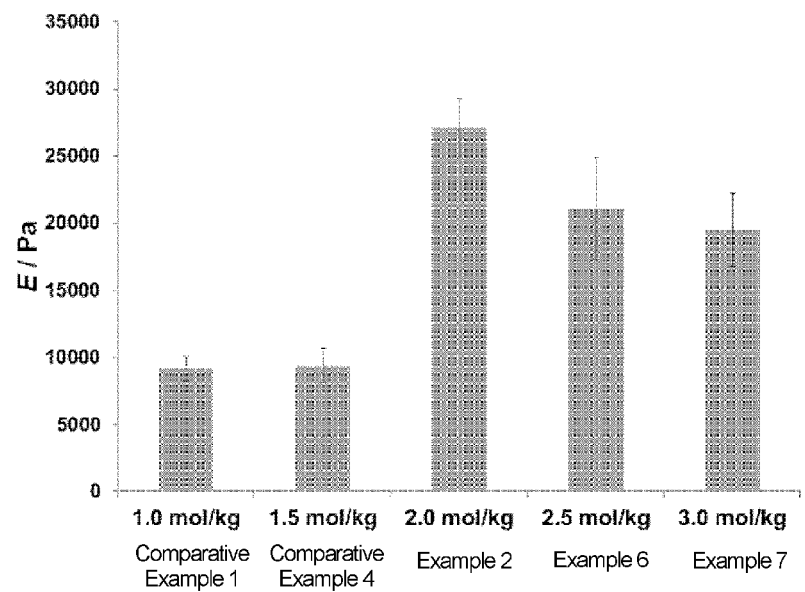
FIG. 2 shows the Young's modulus of Examples 2, 6, and 7, and Comparative Examples 1 and 4.
Figure 3:
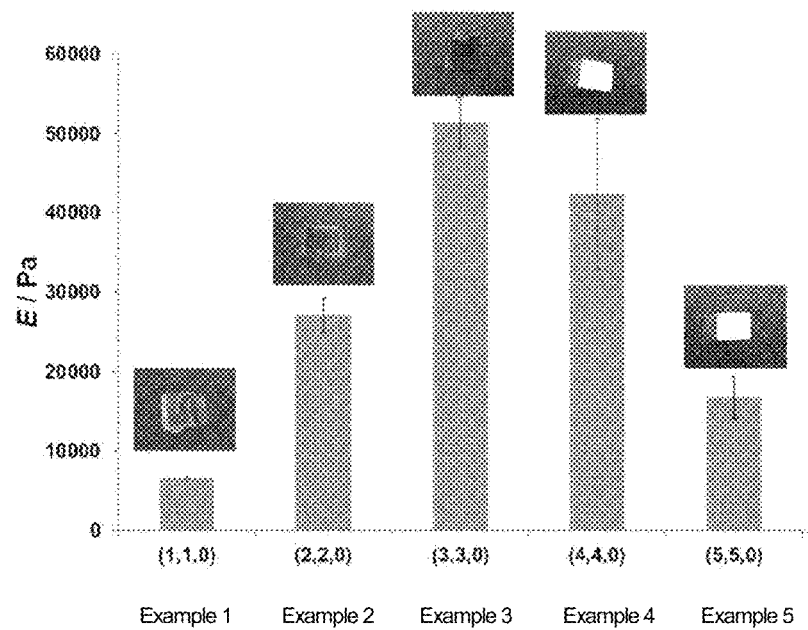
FIG. 3 shows the Young's modulus of Examples 1 to 5 and their photographs.

The Young's modulus (E) of the gel was measured from the initial gradient of the stress-strain curve obtained by the above test method. FIGS. 1 to 3 show the results of the compression test on the gels of Examples 1 to 7 and Comparative Examples 1 to 4.

As shown in FIGS. 1 and 2, when the molar ratio of βCD-AAm-derived units and the molar ratio of Ad-AAm-derived units were both 2 mol % based on the total amount of the monomers, the Young's modulus was significantly improved because the total concentration of the monomers was 2 mol/kg or more. Moreover, as shown in FIG. 3, when the total concentration of the monomers was 2 mol/kg, the highest Young's modulus was observed when the molar ratio of βCD-AAm-derived units and the molar ratio of Ad-AAm-derived units were both 3 mol % based on the total amount of the monomers.

Test Example 1-2 (Tension Test)

FIGS. 4 to 9 show stress-strain curves obtained by the above test method.

Figure 4:
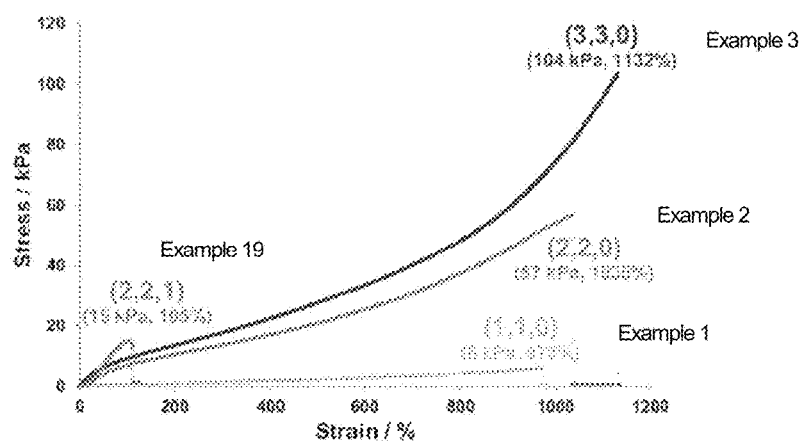
FIG. 4 shows the stress-strain curves of Examples 1 to 3 and 19.

As shown in FIG. 4, when the total concentration of the monomers was 2 mol/kg, the Young's modulus and rupture elongation were improved along with the increase in the molar ratio of βCD-AAm-derived units and the molar ratio of Ad-AAm-derived units based on the total amount of the monomers (Examples 1 to 3).

Figure 5:
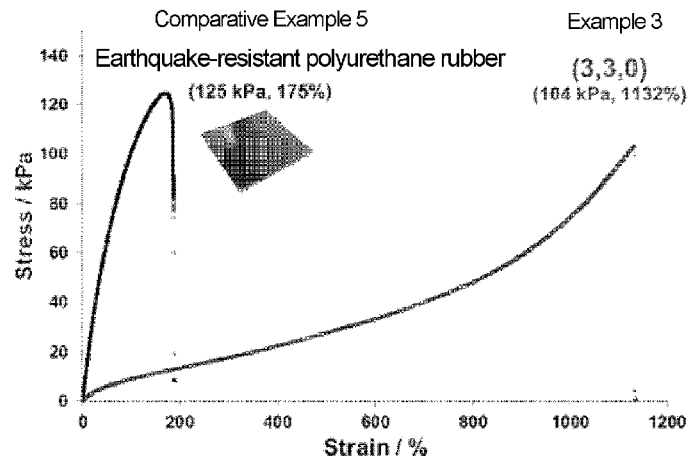
FIG. 5 shows the stress-strain curves of Example 3 and Comparative Example 5.

Moreover, as shown in FIG. 5, when the total concentration of the monomers was 2 mol/kg, and the molar ratio of βCD-AAm-derived units and the molar ratio of Ad-AAm-derived units were both 3 mol % based on the total amount of the monomers (Example 3), the rupture elongation was very high, while the Young's modulus was equivalent to that of the earthquake-resistant polyurethane rubber of Comparative Example 5.

Figure 6:
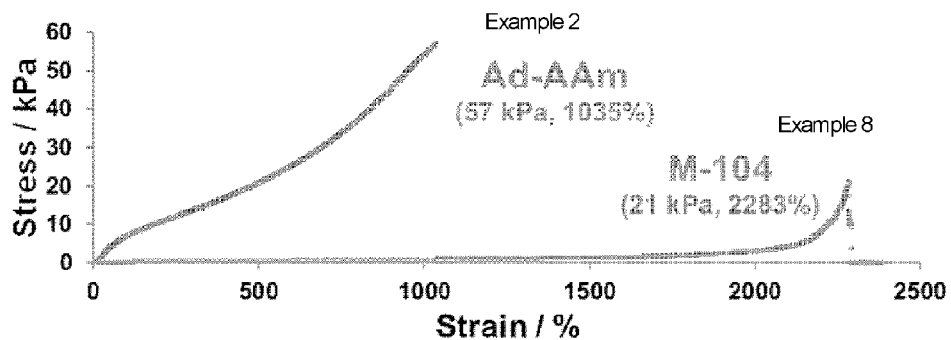
FIG. 6 shows the stress-strain curves of Examples 2 and 8.

Furthermore, as shown in FIG. 6, when Adamantate M-104 was used as the monomer (B) (Example 8), the Young's modulus was lower, but the rupture elongation was higher, compared with when Ad-AAm was used in the same composition ratio (Example 2).

Figure 7:
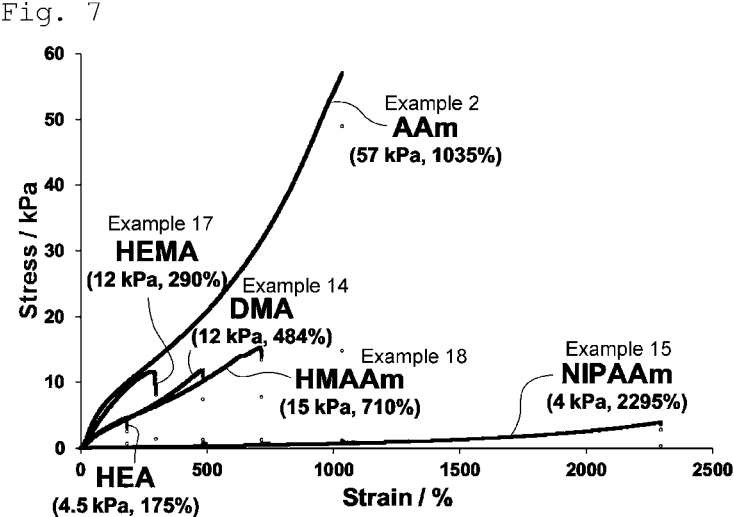
FIG. 7 shows the stress-strain curves of Examples 2, 14, 15, 17, and 18.

In addition, as shown in FIG. 7, when NIPAAm was used as the monomer (C) (Example 15), the Young's modulus was lower, but the rupture elongation was higher, compared with when AAm was used in the same composition ratio (Example 2).

Figure 8:
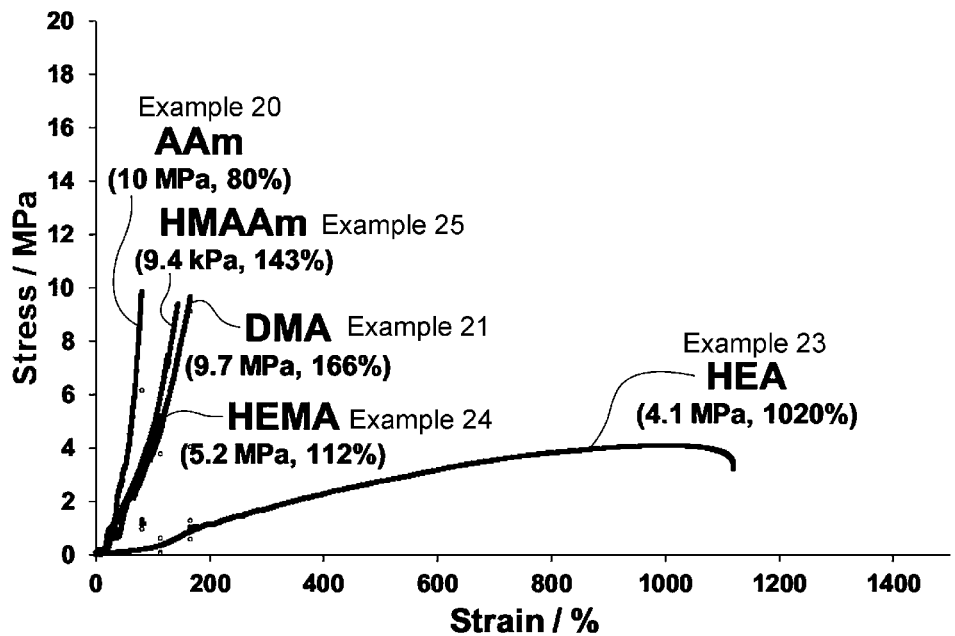
FIG. 8 shows the stress-strain curves of Examples 20, 21, and 23 to 25.
Figure 9:
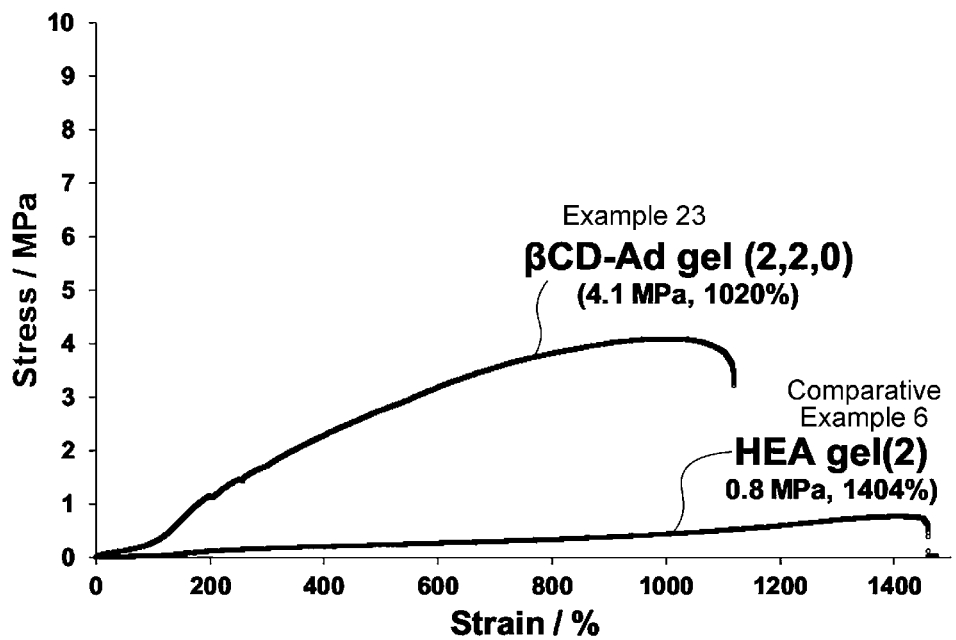
FIG. 9 shows the stress-strain curves of Example 23 and Comparative Example 6.

FIGS. 8 and 9 show stress-strain curves obtained in a tension test on the xerogels. When DMA, HEA, HEMA, or HMAAm was used as the monomer (C) (Examples 21 and 23 to 25, respectively), the Young's modulus was lower, but the rupture elongation was higher, compared with when AAm was used in the same composition ratio (Example 20). Moreover, as shown in FIG. 9, compared with when the monomers (A) and (B) were not used, HEA was used as the monomer (C), and 2 mol % of MBAAm was used as a chemical crosslinking agent (Comparative Example 6), the xerogel using the monomers (A) and (B) showed higher rupture strength while maintaining higher rupture elongation.

Test Example 1-3 (Repeated Tension Test)

Figure 10:
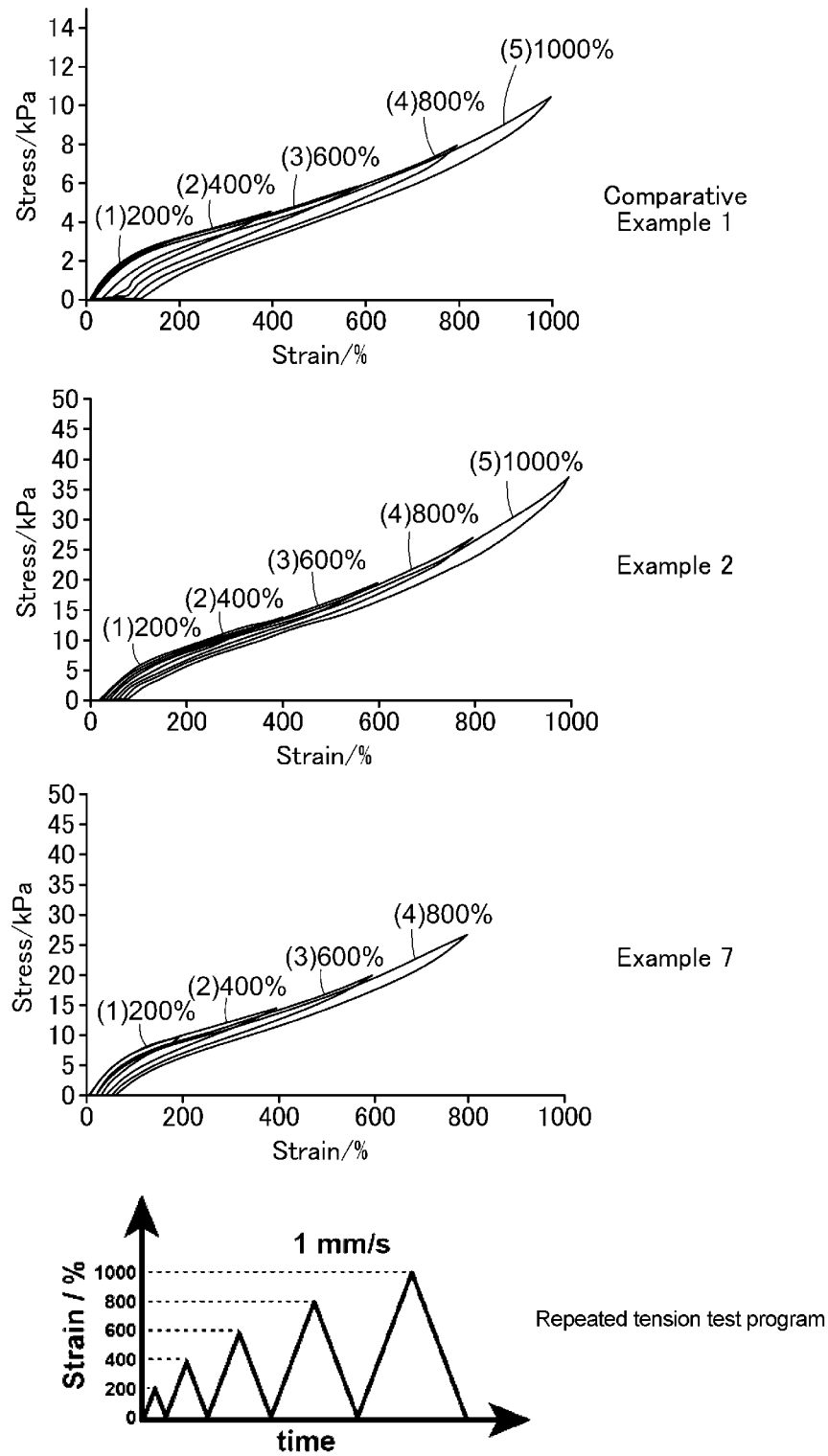
FIG. 10 shows the relationship between the applied strain and time, and the obtained stress-strain curve, when a repeated tension test was conducted in Comparative Example 1, Example 2, and Example 7.

A repeated tension test was conducted using the gels of Comparative Example 1, Example 2, and Example 7. The tension rate was 1 mm/s. Strain was repeatedly applied to each gel as shown below, and stress to the strain was measured. FIG. 10 shows the relationship between the added strain and time, and the obtained stress-strain curves.
(1) 0%→200%→0%
(2) 0%→400%→0%
(3) 0%→600%→0%

(4) 0%→800%→0%
(5) 0%→1000%→0%

Test Example 2 (Evaluation of Toughness)

Test Example 2-1 (Cut Test)

Figure 11:
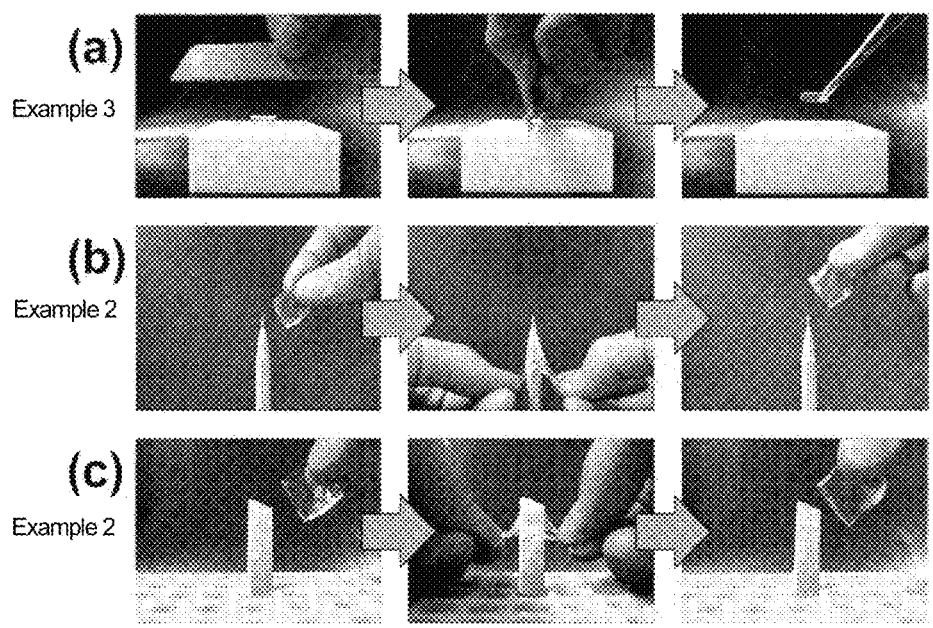
FIG. 11 shows photographs showing the processes of a cut test (a), a pencil penetration test (b), and a cutter blade penetration test (c) in Example 3.

As shown in FIG. 11, when an attempt was made to use a cutter to cut the gel in which the total concentration of the monomers was 2 mol/kg, and the molar ratio of βCD-AAm-derived units and the molar ratio of Ad-AAm-derived units were both 3 mol % based on the total amount of the monomers (Example 3), the gel was not easily cut.

Test Example 2-2 (Pencil Penetration Test and Cutter Blade Penetration Test)

As shown in FIG. 11, when an attempt was made to cause the sharp tip of a pencil or the tip of a cutter blade to penetrate through the gel in which the total concentration of the monomers was 2 mol/kg, and the molar ratio of βCD-AAm-derived units and the molar ratio of Ad-AAm-derived units were both 2 mol % based on the total amount of the monomers (Example 2), they did not easily penetrate through the gel.

Test Example 3 (Self-Repairing Properties)

Test Example 3-1 (Cut Piece Reattachment Test)

Figure 12:
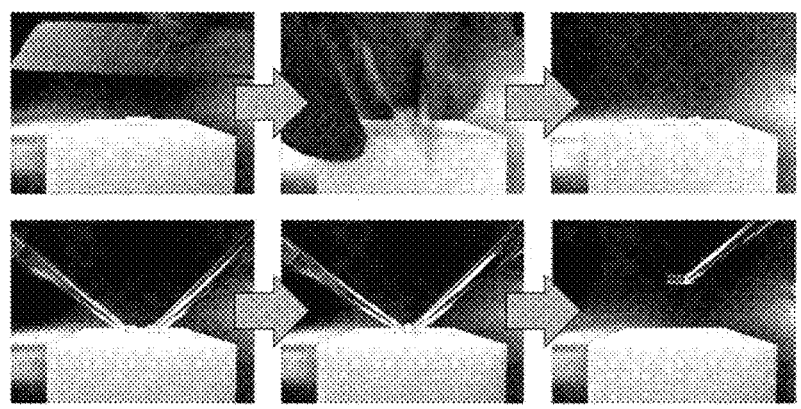
FIG. 12 shows photographs showing the process of a cut piece reattachment test in Example 3.

When cut pieces obtained by cutting the gel in which the total concentration of the monomers was 2 mol/kg, and the molar ratio of βCD-AAm-derived units and the molar ratio of Ad-AAm-derived units were both 3 mol % based on the total amount of the monomers (Example 3), using a cutter while applying a high force, were brought into contact with each other at their cut surfaces, the cut pieces were reattached. FIG. 12 shows the process of cutting the gel and bringing the cut pieces into contact with each other, whereby the cut pieces were reattached.

Test Example 3-2 (Scratch Repairing Properties)

The film-like gels obtained in Examples 26 to 28 were dried by allowing them to stand at room temperature. Scratches were made with a razor on the surface of the obtained film-like xerogels. When a small amount of water was added to the scratched portion of the surface of the xerogels, the scratches were repaired.

Figure 13:
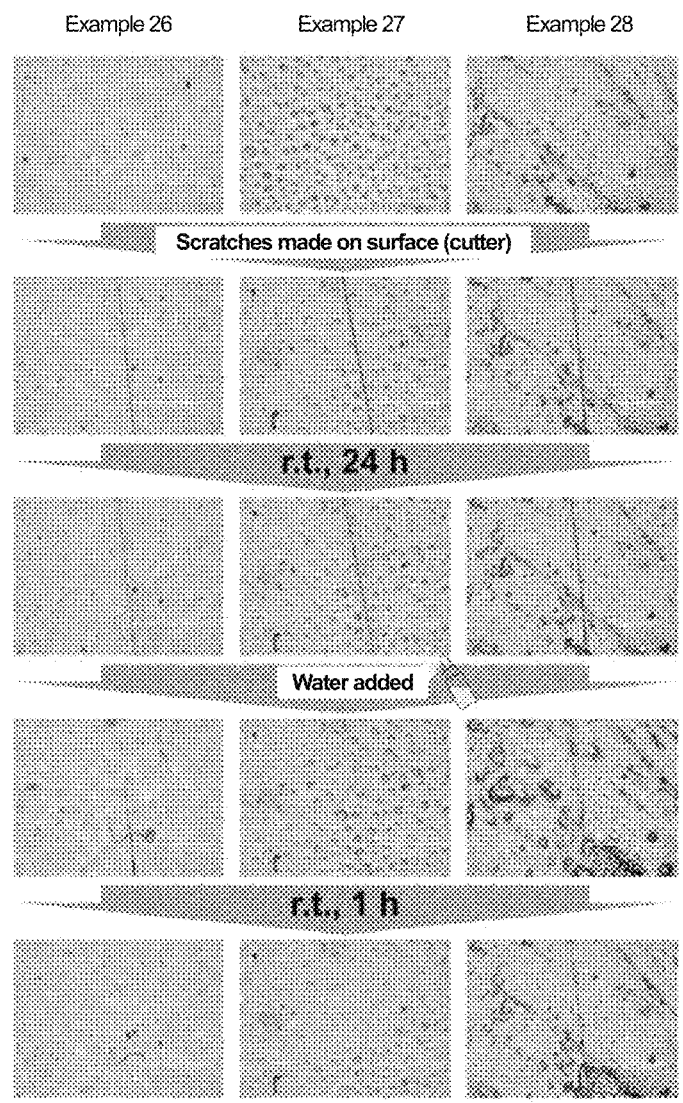
FIG. 13 shows photographs showing the process of scratch repairing in Examples 26 to 28.

FIG. 13 shows the process of making scratches on the xerogel and adding water, whereby the scratches were repaired.

Figure 14:
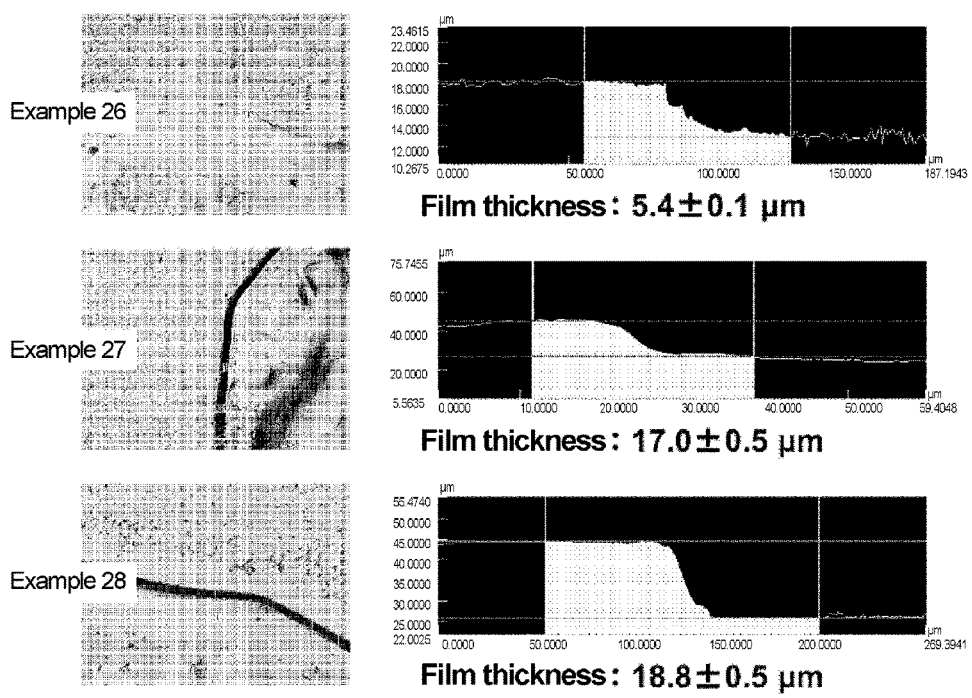
FIG. 14 shows the film thickness of Examples 26 to 28.
Figure 15:
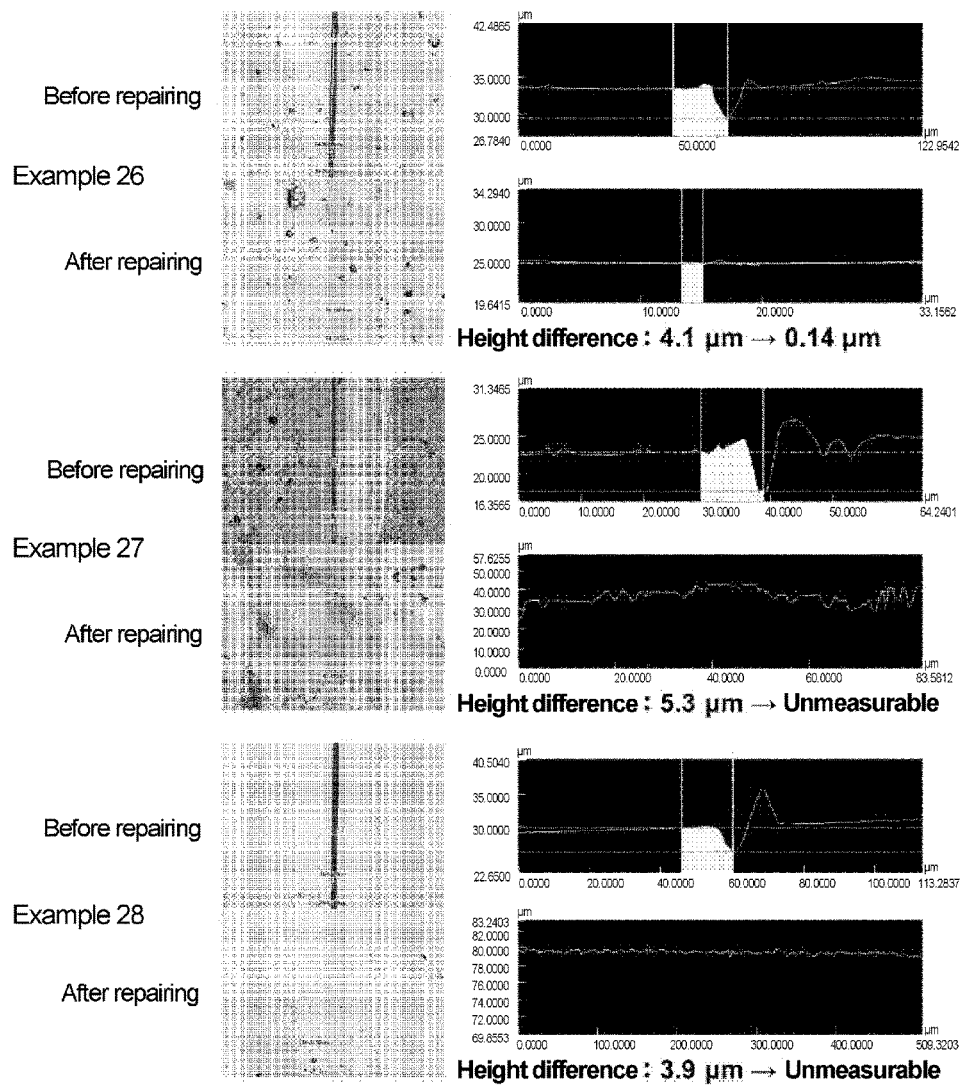
FIG. 15 shows changes in the film thickness before and after scratch repairing in Examples 26 to 28.
Figure 16:
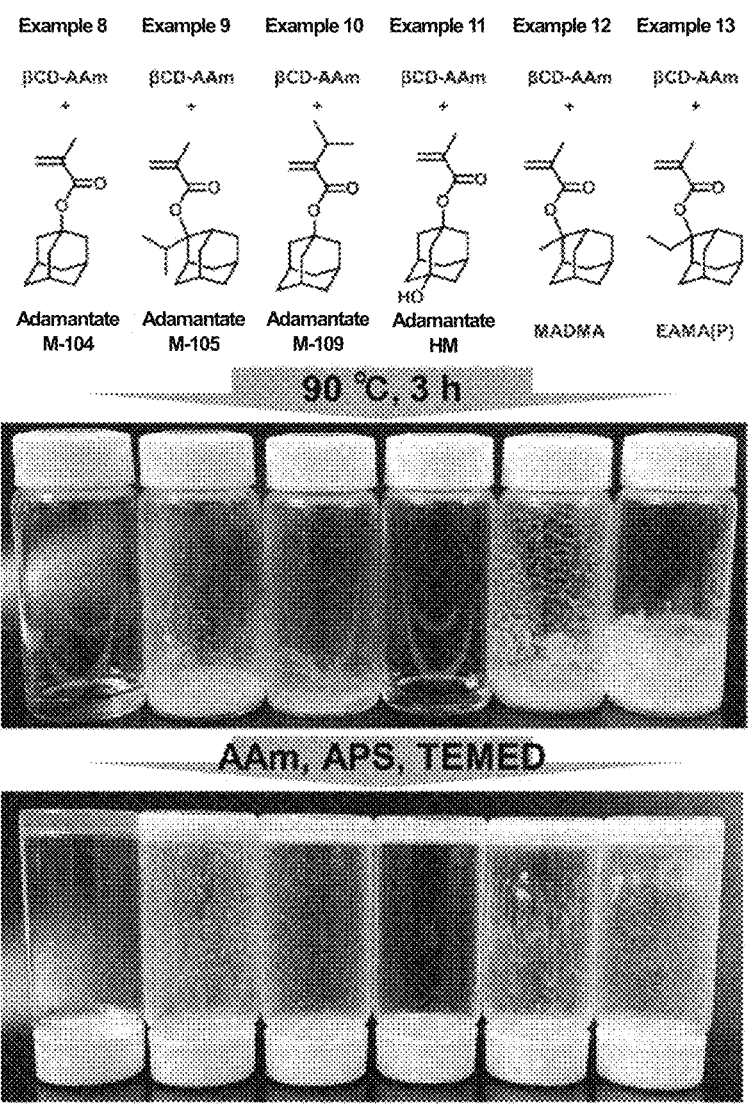
FIG. 16 shows photographs of the gels of Examples 8 to 13.
Figure 17:
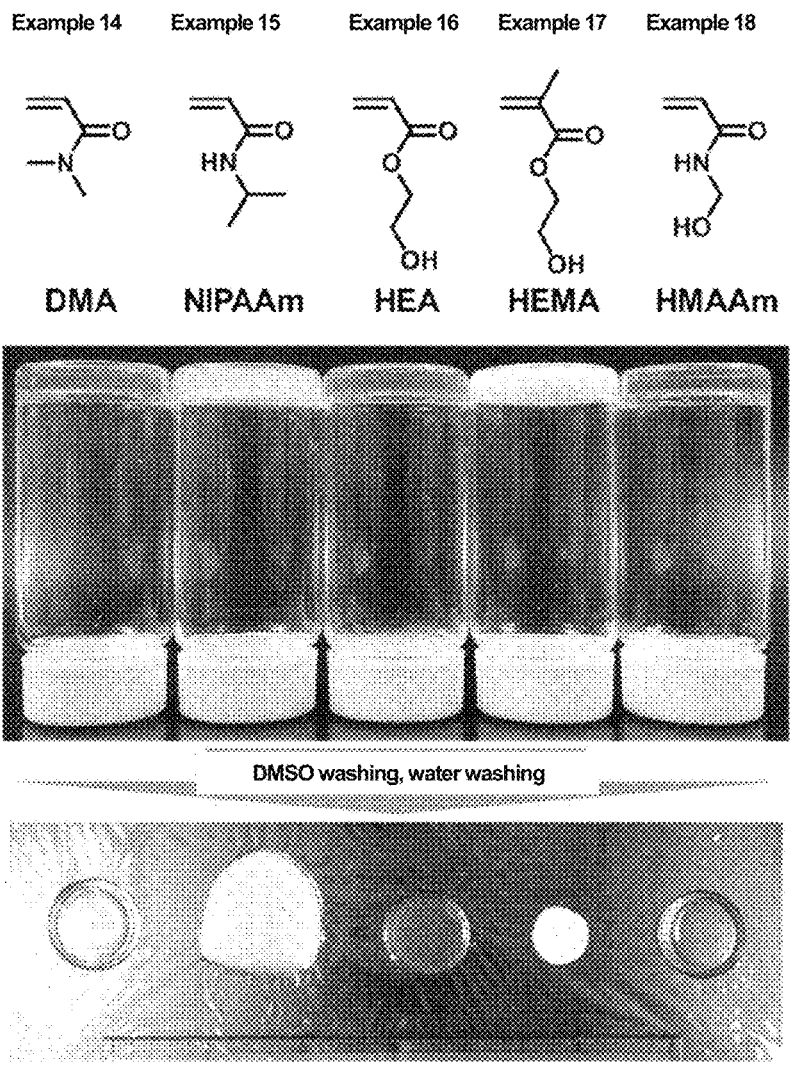
FIG. 17 shows photographs of the gels of Examples 14 to 18.

Further, FIGS. 14 and 15 show the film thickness of the film-like xerogels of Examples 26 to 28, and the film thickness before and after self-repairing when scratches were made with a razor. The height difference of the film thickness, which indicates the depth of scratches made with the razor, became very small. Thus, self-repairing was recognized.

The invention claimed is:
1. A self-repairing material that is a gel comprising a polymer and an aqueous medium, the polymer comprising:
   a monomer unit (a) derived from one or more monomers (A) represented by Formula (A):

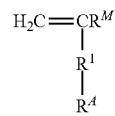

(A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin,
   a monomer unit (b) derived from one or more monomers (B) represented by Formula (B):

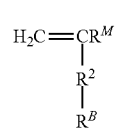

(B)

wherein $R^M$ is the same as the $R^M$ of Formula (A) above,
$R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl,
$R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents, and
   a monomer unit (c) derived from one or more monomers (C) represented by Formula (C):

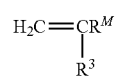

(C)

wherein $R^M$ is the same as the $R^M$ of Formula (A) above, and
$R^3$ represents halogen, hydroxyl, thiol, amino optionally having one substituent, carboxyl optionally having one substituent, or amide optionally having one substituent;
   wherein the polymer is represented by Formula (1-1):

$$(\text{-a-/-b-/-c-})_n \quad (1\text{-}1)$$

wherein
a, b, and c represent the monomer units (a), (b), and (c), respectively, and n is a repetition number and is an integer of 2 or more;

the total concentration of the monomer units (a), (b), and (c) is 2.0 mol/kg or more and 5.0 mol/kg or less;

the monomer units (a), (b), and (c) may be randomly bonded together; and the abundance ratio of each monomer unit is the same or different.

2. A self-repairing material that is a xerogel obtained by drying a gel comprising a polymer and an aqueous medium, the polymer comprising:

a monomer unit (a) derived from one or more monomers (A) represented by Formula (A):

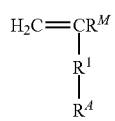

(A)

wherein $R^M$ is selected from the group consisting of hydrogen, methyl, ethyl, propyl, and isopropyl, $R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and $R^A$ represents α-cyclodextrin, β-cyclodextrin, or γ-cyclodextrin, a monomer unit (b) derived from one or more monomers (B) represented by Formula (B):

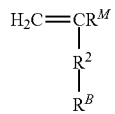

(B)

wherein $R^M$ is the same as the $R^M$ of Formula (A) above, $R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, $R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and $R^2$ and $R^B$ together may form a monovalent group optionally having one or more substituents, and a monomer unit (c) derived from one or more monomers (C) represented by Formula (C):

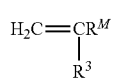

(C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent;

wherein the polymer is represented by Formula (1-1):

Wherein a, b, and c represent the monomer units (a), (b), and (c), respectively, and n is a repetition number and is an integer of 2 or more;

the total concentration of the monomer units (a), (b), and (c) is 2.0 mol/kg or more and 5.0 mol/kg or less;

the monomer units (a), (b), and (c) may be randomly bonded together; and the abundance ratio of each monomer unit is the same or different.

3. The self-repairing material according to claim 1, wherein the ratios of the monomer units (a) and (b) in the self-repairing material based on the total amount of the monomer units are each within a range of 1 to 10 mol %.

4. The self-repairing material according to claim 1, wherein the monomer (A) is one or more monomers represented by Formula (A-1):

(A-1)

wherein $R^M$ is the same as the $R^M$ of Formula (A) above, $R^4$ represents oxygen or —$NR^5$—, $R^5$ represents hydrogen or alkyl optionally having one or more substituents, and $R^A$ is as defined above.

5. The self-repairing material according to claim 1, wherein in Formula (B), $R^2$ is a divalent group formed by removing one hydrogen atom from a monovalent group selected from the group consisting of alkyl, aldehyde, carboxyl, and amide.

6. The self-repairing material according to claim 1, wherein in Formula (B), $R^2$ and $R^B$ together form adamantyl amide optionally having one or more substituents.

7. The self-repairing material according to claim 1, wherein the monomer (B) is acrylamide adamantane.

8. The self-repairing material according to claim 1, wherein the monomer (A) is one or more monomers represented Formula (A-2):

(A-2)

wherein $R^M$ is the same as the $R^M$ of Formula (A) above, and $R^A$ is as defined above.

9. The self-repairing material according to claim 1, wherein $R^A$ is β-cyclodextrin.

10. A liquid composition for manufacturing the self-repairing material according to claim 1, the liquid composition comprising:

one or more monomers (A) represented by Formula (A):

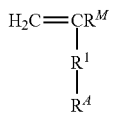
(A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin, one or more monomers (B) represented by Formula (B):

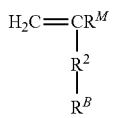
(B)

wherein $R^M$ is the same as the $R^M$ of Formula (A) above,
$R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl,
$R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents, one or more monomers (C) represented by Formula (C):

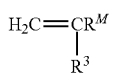
(C)

wherein $R^M$ is the same as the $R^M$ of Formula (A) above, and
$R^3$ represents halogen, hydroxyl, thiol, amino optionally having one substituent, carboxyl optionally having one substituent, or amide optionally having one substituent,
a polymerization initiator, and
an aqueous solvent;

wherein the total concentration of the monomer units (a), (b), and (c) is 2.0 mol/kg or more and 5.0 mol/kg or less.

11. A method for manufacturing a self-repairing material, the method comprising:

step A of mixing and dissolving one or more monomers (A), one or more monomers (B), and one or more monomers (C) in an aqueous solvent, thereby obtaining a monomer mixture solution A in which the total concentration of the monomers (A), (B), and (C) is 2.0 mol/kg or more and 5.0 mol/kg or less, wherein the one or more monomers (A) are represented by Formula (A):

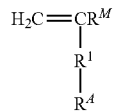
(A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin, the one or more monomers (B) are represented by Formula (B):

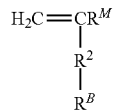
(B)

wherein $R^M$ is the same as the $R^M$ of Formula (A) above,
$R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one substituent, aldehyde, and carboxyl,
$R^B$ represents one member selected from the group consisting of alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents, and the one or more monomers (C) are represented by Formula (C):

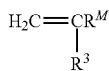 (C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent; and step B of adding a polymerization initiator to the monomer mixture solution A, thereby obtaining a gel comprising a polymer represented by Formula (1-1):

$$(\text{-a-/-b-/-c-})_n \quad (1\text{-}1)$$

wherein
a, b, and c represent the monomer units (a), (b), and (c), respectively, and n is a repetition number and is an integer of 2 or more;
the monomer units (a), (b), and (c) may be randomly bonded together; and
the abundance ratio of each monomer unit is the same or different.

12. The manufacturing method according to claim 11, further comprising step C of drying the gel obtained in step B to obtain a xerogel.

13. The manufacturing method according to claim 11, wherein the molar ratios of the monomers (A) and (B) based on the total amount of the monomers (A), (B), and (C) in the monomer mixture solution A are each within a range of 1 to 10 mol %.

14. The manufacturing method according to claim 11, wherein the polymerization initiator is a photopolymerization initiator.

15. The manufacturing method according to claim 11, wherein the polymerization initiator is ammonium persulfate (APS) or N,N,N',N'-tetramethylethylenediamine (TEMED).

16. The self-repairing material according to claim 2, wherein the ratios of the monomer units (a) and (b) in the self-repairing material based on the total amount of the monomer units are each within a range of 1 to 10 mol %.

17. The self-repairing material according to claim 2, wherein the monomer (A) is one or more monomers represented by Formula (A-1):

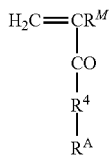 (A-1)

wherein $R^M$ is the same as the $R^M$ of Formula (A) above,
$R^4$ represents oxygen or —$NR^5$—,
$R^5$ represents hydrogen or alkyl optionally having one or more substituents, and
$R^A$ is as defined above.

18. The self-repairing material according to claim 2, wherein in Formula (B), $R^2$ is a divalent group formed by removing one hydrogen atom from a monovalent group selected from the group consisting of alkyl, aldehyde, carboxyl, and amide.

19. The self-repairing material according to claim 2, wherein in Formula (B), $R^2$ and $R^B$ together form adamantyl amide optionally having one or more substituents.

20. A liquid composition for manufacturing the self-repairing material according to claim 2, the liquid composition comprising:
one or more monomers (A) represented by Formula (A):

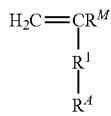 (A)

wherein $R^M$ is selected from the group consisting of hydrogen, methyl, ethyl, propyl, and isopropyl,
$R^1$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl, and
$R^A$ represents α-cyclodextrin, β-cyclodextrin, or γ-cyclodextrin,
one or more monomers (B) represented by Formula (B):

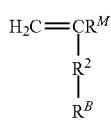 (B)

wherein $R^M$ is the same as the $R^M$ of Formula (A) above,
$R^2$ represents a divalent group formed by removing one hydrogen atom from a monovalent group selected from the group consisting of hydroxyl, thiol, alkoxy optionally having one or more substituents, thioalkoxy optionally having one or more substituents, alkyl optionally having one or more substituents, amino optionally having one substituent, amide optionally having one or more substituents, aldehyde, and carboxyl,
$R^B$ represents one member selected from the group consisting of $C_1$-$C_{30}$ alkyl optionally having one or more substituents, cycloalkyl optionally having one or more substituents, aryl optionally having one or more substituents, heteroaryl optionally having one or more substituents, and a monovalent group formed by removing one hydrogen atom from an organometallic complex, and
$R^2$ and $R^B$ together may form a monovalent group optionally having one or more substituents,
one or more monomers (C) represented by Formula (C):

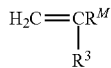 (C)

wherein $R^M$ is the same as the $R^M$ of Formula (A) above, and $R^3$ represents halogen, hydroxyl, thiol, amino optionally having one substituent, carboxyl optionally having one substituent, or amide optionally having one substituent, a polymerization initiator, and
an aqueous solvent;
wherein the total concentration of the monomer units (a), (b), and (c) is 2.0 mol/kg or more and 5.0 mol/kg or less.

* * * * *